(12) United States Patent
Baecke et al.

(10) Patent No.: US 9,633,018 B2
(45) Date of Patent: Apr. 25, 2017

(54) GENERATION OF RELATED CONTENT FOR SOCIAL MEDIA POSTS

(71) Applicant: Microsoft Corporation, Redmond, WA (US)

(72) Inventors: Paul Baecke, London (GB); Mark Atherton, Lymington (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 13/740,265

(22) Filed: Jan. 14, 2013

(65) Prior Publication Data

US 2014/0201178 A1    Jul. 17, 2014

(51) Int. Cl.
*G06F 17/30* (2006.01)

(52) U.S. Cl.
CPC .............. *G06F 17/30038* (2013.01)

(58) Field of Classification Search
CPC ............. G06F 17/30864; G06F 17/30038
USPC .................................. 707/706, 736
See application file for complete search history.

(56) References Cited

U.S. PATENT DOCUMENTS

| | | | | |
|---|---|---|---|---|
| 6,346,952 | B1 * | 2/2002 | Shtivelman | 715/758 |
| 6,785,708 | B1 * | 8/2004 | Busey et al. | 709/204 |
| 7,165,213 | B1 * | 1/2007 | Busey | 715/205 |
| 7,263,526 | B1 * | 8/2007 | Busey et al. | |
| 7,921,156 | B1 * | 4/2011 | Stolorz et al. | 709/203 |
| 8,090,779 | B2 * | 1/2012 | Ludwig et al. | 709/206 |
| 8,250,145 | B2 * | 8/2012 | Zuckerberg et al. | 709/204 |
| 8,290,999 | B2 * | 10/2012 | Shepherd et al. | 707/728 |
| 8,489,657 | B2 * | 7/2013 | Shepherd et al. | 707/728 |
| 8,495,508 | B2 * | 7/2013 | Lebrun | 715/758 |
| 8,611,929 | B1 * | 12/2013 | Vandehey | H04W 4/02 455/456.3 |
| 8,832,188 | B1 * | 9/2014 | Cierniak | 709/204 |
| 2005/0004840 | A1 * | 1/2005 | Wanninger | 705/14 |
| 2005/0256866 | A1 * | 11/2005 | Lu et al. | 707/5 |
| 2007/0078884 | A1 * | 4/2007 | Ott et al. | 707/102 |
| 2008/0005064 | A1 * | 1/2008 | Sarukkai | 707/3 |
| 2008/0154951 | A1 * | 6/2008 | Martinez et al. | 707/103 Y |
| 2008/0163074 | A1 * | 7/2008 | Tu | 715/758 |

(Continued)

OTHER PUBLICATIONS

Horiguchi, Satoshi, et al., "GaChat: A chat system that displays online retrieval information in dialog text", VISSW2009 / IUI2009, Sanibel Island, FL, Feb. 8, 2009, pp. 1-5.*

(Continued)

*Primary Examiner* — Robert Stevens

(57) ABSTRACT

Architecture presents in a display related content in association with (an annotation) a social media post, as derived from post information of the social media post itself. The related content can be presented in the user interface proximate the social media post or elsewhere in the user interface. The related content can be presented as search engine queries, images, videos, and/or links to related websites. More specifically, the disclosed architecture facilitates the automated annotation of a social media post with related content derived from: post information such as a URL (uniform resource locator) referred to in the social media post, post information such as the text, image(s), and/or video content in a social media post itself, and post information such as content linked-to by a URL referred to in a social media post.

20 Claims, 11 Drawing Sheets

(56) References Cited

U.S. PATENT DOCUMENTS

| | | | |
|---|---|---|---|
| 2008/0201437 A1* | 8/2008 | Ludwig et al. | 709/206 |
| 2008/0215589 A1* | 9/2008 | Elhaik | 707/10 |
| 2008/0288338 A1* | 11/2008 | Wiseman et al. | 705/14 |
| 2009/0079750 A1* | 3/2009 | Waxman et al. | 345/581 |
| 2009/0125481 A1* | 5/2009 | Mendes da Costa et al. | 707/3 |
| 2009/0210778 A1* | 8/2009 | Kulas et al. | 715/201 |
| 2009/0319449 A1* | 12/2009 | Gamon et al. | 706/12 |
| 2010/0199340 A1* | 8/2010 | Jonas et al. | 726/8 |
| 2010/0306049 A1* | 12/2010 | Kakade et al. | 705/14.49 |
| 2011/0004831 A1* | 1/2011 | Steinberg et al. | 715/753 |
| 2011/0137845 A1* | 6/2011 | Ward | 706/50 |
| 2011/0196855 A1* | 8/2011 | Wable et al. | 707/711 |
| 2011/0246502 A1* | 10/2011 | Aguera y Arcas et al. | 707/769 |
| 2011/0246920 A1* | 10/2011 | Lebrun | 715/769 |
| 2011/0288912 A1* | 11/2011 | McCrea et al. | 705/14.2 |
| 2012/0011432 A1* | 1/2012 | Strutton | 715/234 |
| 2012/0054369 A1* | 3/2012 | Shafi et al. | 709/246 |
| 2012/0110458 A1* | 5/2012 | Brown et al. | 715/733 |
| 2012/0150833 A1* | 6/2012 | Parthasarathy et al. | 707/706 |
| 2012/0197984 A1* | 8/2012 | Rao | 709/203 |
| 2012/0265819 A1* | 10/2012 | McGann et al. | 709/204 |
| 2012/0278740 A1 | 11/2012 | Robinson et al. | |
| 2012/0296991 A1* | 11/2012 | Spivack et al. | 709/206 |
| 2012/0324016 A1* | 12/2012 | Stolorz et al. | 709/204 |
| 2013/0031125 A1* | 1/2013 | Graham et al. | 707/769 |
| 2013/0080266 A1* | 3/2013 | Molyneux et al. | 705/14.72 |
| 2013/0204940 A1* | 8/2013 | Kinsel et al. | 709/204 |
| 2013/0304822 A1* | 11/2013 | Tetreault | 709/204 |
| 2014/0025737 A1* | 1/2014 | Kruglick | 709/204 |
| 2014/0040029 A1* | 2/2014 | Vhora | 705/14.54 |
| 2014/0081994 A1* | 3/2014 | Becker et al. | 707/749 |
| 2014/0101145 A1* | 4/2014 | Alonso et al. | 707/728 |
| 2014/0129324 A1* | 5/2014 | Spivack et al. | 705/14.45 |
| 2014/0143030 A1* | 5/2014 | Zeinfeld | 705/14.1 |
| 2014/0156762 A1* | 6/2014 | Yuen et al. | 709/206 |
| 2014/0181205 A1* | 6/2014 | Sherrets et al. | 709/204 |

OTHER PUBLICATIONS

Shamma, David A., et al., "Watch What I Watch", MIR '07, Augsburg, Bavaria, Germany, Sep. 28-29, 2007, pp. 275-283.*

Phan, Zuan-Hieu, et al., "Learning to Classify Short and Sparse Text & Web with Hidden Topics from Large-scale Data Collections", WWW 2008, Beijing, China, Apr. 21-25, 2008, pp. 91-100.*

Güven, Sinem, et al., "Social Mobile Augmented Reality for Retail", PerCom 2009, Galveston, TX, Mar. 9-13, 2009, pp. 1-3.*

Farrell, Stephen, et al., "Fringe Contacts: People-Tagging for the Enterprise", IBM Research Report, RJ10384 (A0606-027), Jun. 30, 2006, 6 pages.*

Phan, Zuan-Hieu, et al., "A Hidden Topic-Based Framework toward Building Applications with Short Web Documents", IEEE Transactions on Knowledge and Data Engineering, vol. 23, No. 7, Jul. 2011, pp. 961-976.*

Becker, Hila, et al., "Identifying Content for Planned Events Across Social Media Sites", WSDM '12, Seattle, WA, Feb. 8-12, 2012, pp. 533-542.*

Bojārs, Uldis, et al., "Interlinking the Social Web with Semantics", IEEE Intelligent Systems, vol. 23, Issue 3, May-Jun. 2008, pp. 29-40.*

Chandra, Swarup, et al., "Estimating Twitter User Location Using Social Interactions—A Content Based Approach", PASSAT and SocialCom 2011, Boston, MA, Oct. 9-11, 2011, pp. 838-843.*

Claros, Iván D., et al., "An Approach for T-Learning Content Generation Based on a Social Media Environment", EuroITV '12, Berlin, Germany, Jul. 4-6, 2012, pp. 157-160.*

Naaman, Mor, et al., "Is it Really About Me? Message Content in Social Awareness Streams", CSCW 2010, Savannah, GA, Feb. 6-10, 2010, pp. 189-192.*

Kiciman, Emre, "Language Differences and Metadata Features on Twitter", SIGIR 2010 WEB N-GRAM Workshop, Geneva, Switzerland, Jul. 23, 2010, pp. 47-51.*

Kinsella, Sheila, "Augmenting Social Media Items with Metadata using Related Web Content", Ph. D. Thesis, National University of Ireland, Galway, Jan. 2012, 194 pages.*

Vuorikari, Riina, et al., "Comparison of tagging in an educational context: Any chances of interplay?", Int. J. Technology Enhanced Learning, vol. 2, © 2010 Inderscience Enterprises Ltd., pp. 111-131.*

Weaver, Alfred C., et al., "Social Networking", Computer, vol. 41, Issue 2, IEEE Computer Society, Feb. 2008, pp. 97-100.*

Zarro, Michael, et al., "Pinterest: Social Collecting for #linking #using #sharing", JCDL '12, Washington, DC, Jun. 10-14, 2012, pp. 417-418.*

Abel, Fabian, et al., "Semantic Enrichment of Twitter Posts for User Profile Construction on the Social Web", ESWC 2011, Part II, LNCS 6644, Springer-Verlag, Berlin, Germany, © 2011, pp. 375-389.*

Rizzo, Giuseppe, et al., "What Fresh Media Are You Looking for? Retrieving Media Items from Multiple Social Networks", SAM '12, Nara, Japan, Oct. 29, 2012, pp. 15-20.*

Wu, Pengcheng, et al., "Mining Social Images with Distance Metric Learning for Automated Image Tagging", WSDM '11, Hong Kong, China, Feb. 9-12, 2011, pp. 197-206.*

Pantel, et al., "Social Annotations: Utility and Prediction Modeling", Retrieved at <<http://www.patrickpantel.com/download/papers/2012/sigir12.pdf>>, In 35th International ACM SIGIR conference on research and development in Information Retrieval, Aug. 12, 2012, 10 pages.

Laird, Sam, "Facebook Launches Word Press Tool, Makes Blogging More Social", Retrieved at <<http://mashable.com/2012/06/12/facebook-wordpress/>>, Jun. 6, 2012, 2 pages.

Muralidharan, et al., "Social Annotations in Web Search", Retrieved at <<http://www.eecs.berkeley.edu/~aditi/papers/chi12-social-annotations.pdf>>, In ACM annual conference on Human Factors in Computing Systems. May 5, 2012. 10 pages.

Anderson, Meghan Keaney, "HubSpot Social Media Tool Now Posts to Linkedin Groups", Retrieved at <<http://www.hubspot.com/blog/bid/33816/HubSpot-Social-Media-Tool-Now-Posts-to->>, Nov. 19, 2012, 4 pages.

Kabani, Shama, "Is automating social-media posts good or bad? Yes", Retrieved at <<http://residualrx.com/2012/08/10/is-automating-social-media-posts-good-or-bad-yes/>>, Aug. 10, 2012, 4 pages.

Randfish, "Social Annotations in Search: Now You're Social Network=Rankings", Retrieved at <<http://www.seomoz.org/blog/social-annotations-in-search-now-your-social-network-rankings>>, Jun. 22, 2011, 24 pages.

Braendhaugen, Andreas, "Cooper helps Chefs Feed launch new social features", Retrieved at <<http://www.cooper.com/journal/2012/10/cooper-helps-chefs-feed-launch-new-social-features.html>>, Oct. 9, 2012, 3 pages.

* cited by examiner

GENERATION OF RELATED CONTENT FOR SOCIAL MEDIA POSTS

BACKGROUND

The vast and ever-increasing amount of information made available on the web makes it difficult for users to readily find the desired information. For example, a simple search query on a topic may result in millions of results returned. While this is an improvement, it remains a daunting task to then peruse these results for the desired information.

Search engine technology has improved by attempting to find related or relevant other information to present in the results to the given search user. For example, social features are increasingly integrated within the search engine results page of the main search engines. However, there are many different environments such as social networking sites and messaging sites, for example, now in existence in which users may not want to leave a given technology to then perform a search using the mainstream search engines. For example, users of social media sites are often tempted to further explore concepts or persons shared in a social media post.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture relates to techniques for automatically generating related queries for use in social media posts such as annotate a feed social media post with related queries (and hence, content) that link to a results page on a search engine and/or another algorithmically derived destination web document. For example, the architecture automates annotation of a social media post with related content derived from a URL (uniform resource locator) referred to in the social media post, annotation of the social media post with the related content derived from text, image or video content in the social media post itself, and the annotation of the social media post with related content derived from the content linked to by the URL referred to in the social media post.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
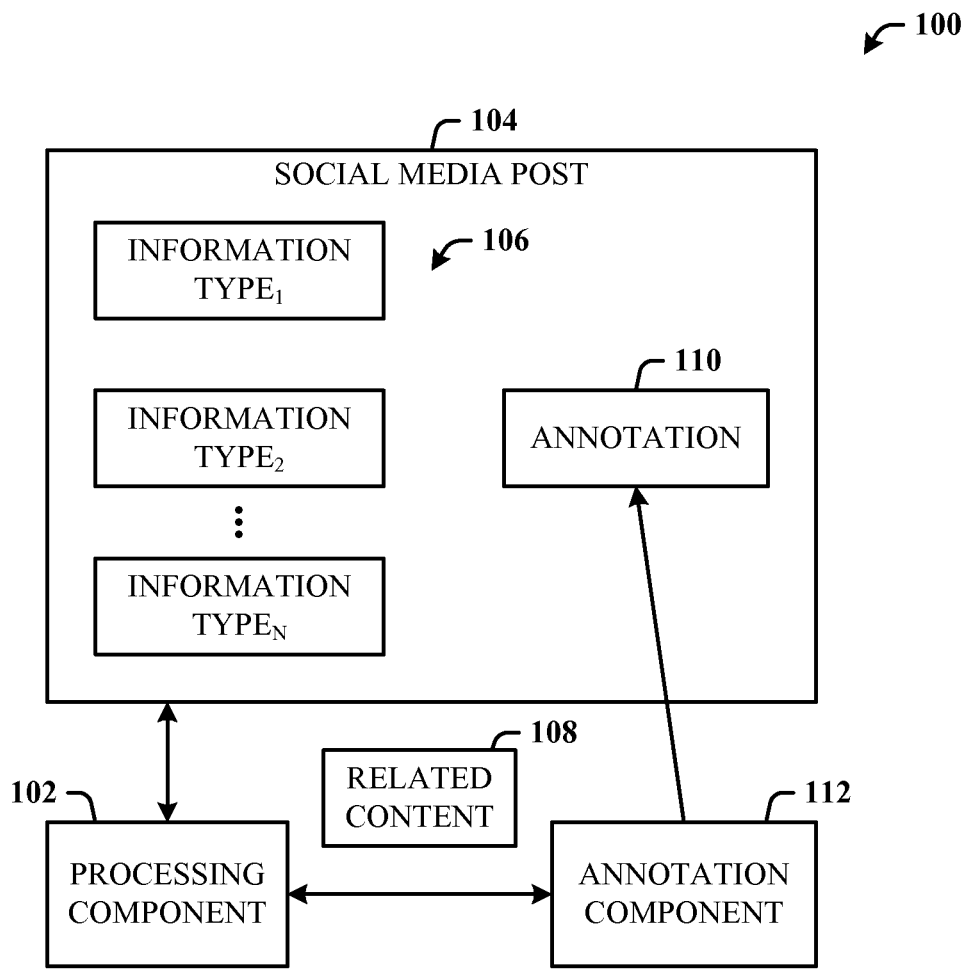
FIG. 1 illustrates a system in accordance with the disclosed architecture.

The disclosed architecture is a process that results in showing or presenting in a display related content in association with (an annotation) a social media post, as derived from post information of the social media post itself. The related content can be presented in the user interface proximate the social media post or elsewhere in the user interface. The related content can be presented as search engine queries, images, videos, and/or links to related websites, for example.

More specifically, the disclosed architecture facilitates: the automated annotation of a social media post with related content derived from post information such as a URL (uniform resource locator) referred to in the social media post, the automated annotation of a social media post with related content derived from post information such as the text, image(s), and/or video content in a social media post itself, and the automated annotation of a social media post with related content derived from the post information such as content linked-to by a URL referred to in a social media post.

Extensions to the above include, but are not limited to, a more generalized implementation of the automated annotation technique described herein with respect to social media posts, but now applied to content of a webpage, such that the content of a webpage can be further annotated with additional related content, as derived from a URL referred to in the webpage content, as derived from text, image(s), and/or video content in a the webpage itself, and as derived from content linked-to by a URL referred to in the webpage.

The extensions can further include the implementation to content in an application (e.g., a messaging application during the use of this application), such that the content of an application (e.g., a message) can be further annotated with additional related content, as derived from a URL referred to in the application, as derived from text, image(s), and/or video content in a the application itself, and as derived from content linked-to by a URL referred to in the application.

Yet another extension can include the implementation to content displayed in a browser application by surfacing (e.g., presenting) the related content in a dedicated area of the application, or a toolbar, or a user experience (UX) that can be activated by a gesture (e.g., hand pose, voice or speech command, etc.).

Still another extension can include the implementation to any application for the automated annotation of the application features or operations with related content derived from the application information such as obtained from linked-to by a URL referred to in or by the application.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include a processing component 102 that receives a social media post 104 having post information of different information types 106 such as a URL and/or multimedia. The multimedia can include any one or more information types of text, image, and video. The post information can comprise all information of the social media post 104, such as title, snippet, links, images, etc. These are described in more detail hereinbelow. The processing component 102 processes the information types 106 to derive related content 108. The related content 108 can be accessed via or presented as a link or query included as part of an annotation 110 to the post 104.

An annotation component 112 annotates the social media post 104 with the related query as the annotation 110 for viewing in association with the social media post 104. The annotation 110 can include a related query to the related content 108. The annotation component 112 can be commonly known method/programs that facilitate the positioning and rendering of the annotation 110 at the desired location as part of (or proximate to) the social media post 104.

The processing component 102 detects and processes a uniform resource locator (URL) as an information type 106 of the social media post 104 to derive the related query (or related content 108). The processing component 102 detects and processes a URL as an information type 106 of the social media post 104, where the related query (or related content 108) is derived from content linked-to by the URL. The processing component 102 detects and processes multimedia content as an information type 106 of the social media post 104. The related query (or related content 108) is derived from the multimedia content. The processing component 102 is part of a service that when called discriminates the information types 106 as a URL, or multimedia associated with a social media post.

The annotation component 112 further annotates the social media post 104 with the annotation 110 of related content that is an image or a video. The processing component 102 detects and processes a URL as an information type of the social media post 104 to derive the related query, where the URL is a news URL or a general URL. The processing component 102 processes the social media post 104 as a text post and extracts a dominant entity from the text post for suggestions processing to return suggested related content for annotation of the social media post 104.

Figure 2:
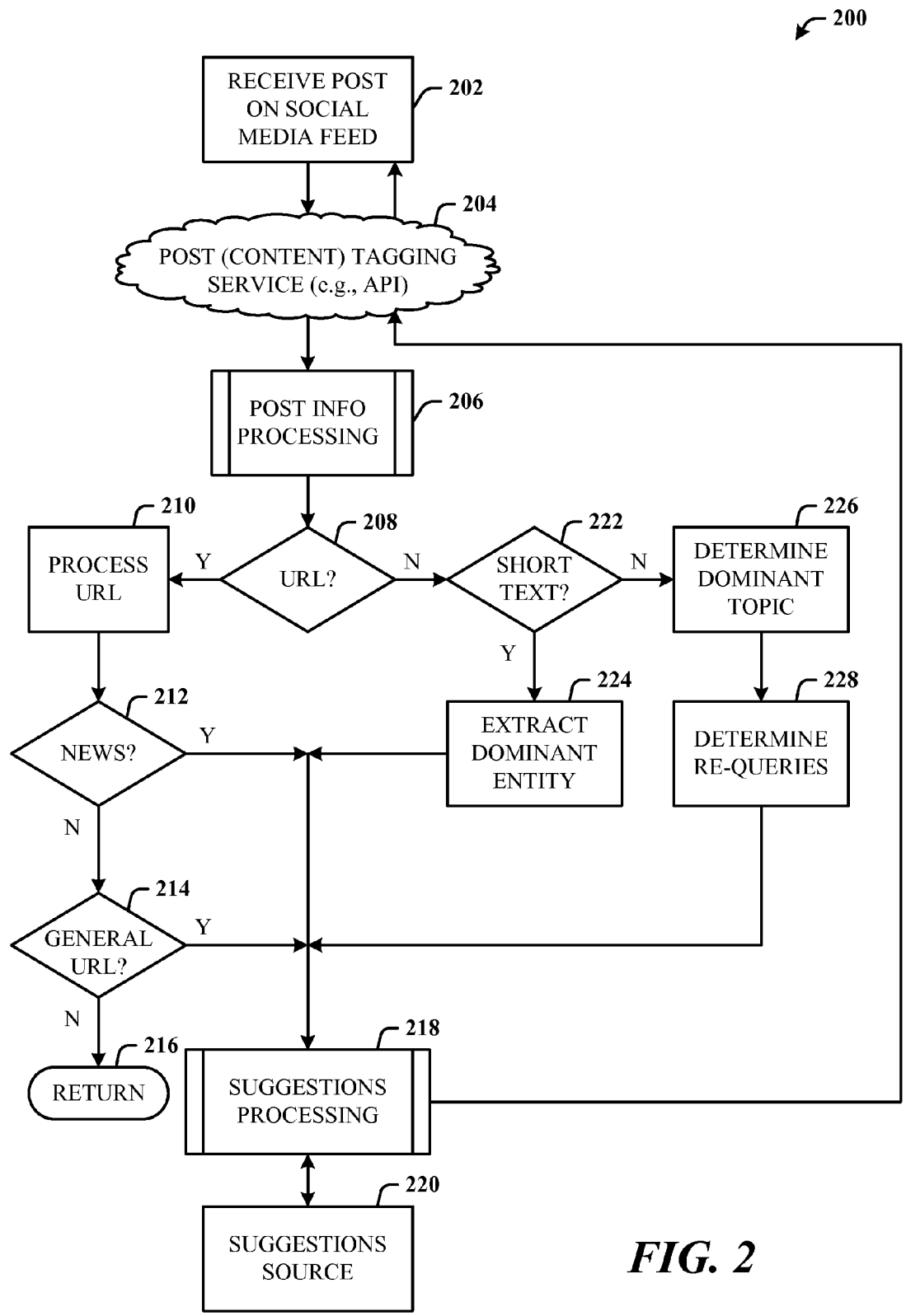
FIG. 2 illustrates a flow diagram of a service that deliveries related queries of content in accordance with the disclosed architecture.

FIG. 2 illustrates a flow diagram 200 of a service that deliveries related queries of content in accordance with the disclosed architecture. The description for this flow diagram 200 can include a differentiation between a short text posting and a text posting having more words/characters than the short text posting (a "longer text posting"). The differentiation can be defined generally for all implementations or for a given implementation, where, for example, a short text posting can be a posting that includes less than a predetermined number of words/characters (e.g., less than one hundred), and hence, the longer text posting has a greater number of the words/characters. At 202, a post (content) on a social media feed is received. A post (content) tagging service 204, which can be implemented as an API (application programmable interface), is called and processes the post information to determine the nature of this post information such as a news feed, text message, etc. The service 204 can be called within a search engine or outside the search engine. Flow is then to 206 for initiation of the post information (info) processing. As part of the post information processing, at 208, the service 204 checks if the post information includes a URL. This flow performs the automated annotation of the social media post with related content derived from a URL referred to in the post information.

If yes, flow is to 210 to process the URL, to determine if the URL is related to news, as checked at 212. If not a news URL, flow is from 212 to 214, where the service 204 determines if the URL is a general URL. If not, flow is to 216, which returns flow back from the service 204 to the calling entity or an error processing method, for example, since the URL could not be resolved.

On the other hand, if at 212, the URL is related to news, flow is to suggestions processing 218 to fetch suggestion(s) related to the news URL, from a suggestions source 220. Once fetched, the suggestion(s) are sent back from the service 204 to the social media feed for presentation in association with the post.

If the URL is not related to news, but is a general URL, flow is from 214 to suggestions processing 218 to fetch suggestion(s) related to the general URL, from the suggestions source 220. Once fetched, the suggestion(s) are sent back from the service 204 to the social media feed for presentation in association with the post.

Returning to 208, if the post information processing 206 indicates the post information does not include a URL, flow is from 208 to 222 to analyze the post to determine if the post is more closely typed as a shorttextual post. If so, automated annotation of a social media post is performed with related content derived from the text, image(s), and/or video content in the short social media post itself. Accordingly, flow is from 222 to 224 to extract the dominant entity of the content, and then pass the dominant entity to suggestions processing 218. Once fetched, the suggestion(s) are sent back from the service 204 to the social media feed for presentation in association with the post.

If post information processing 206 indicates the content is neither a URL nor a short text post, flow is from 222 to 226 to determine the dominant topic. Flow is then to 228 to determine re-queries based on the dominant topic, and then to pass the dominant topic to the suggestions processing 218. Once fetched, the suggestion(s) is (are) sent back from the service 204 to the social media feed for presentation in association with (annotation of) the post.

Put another way, the architecture comprises at least two parts: a service that delivers the related queries for the content (e.g., implemented as an API, and called from within or outside of the search engine), and a procedure that generates related queries for content.

The service determines the type of post information (e.g., URL, multimedia, etc.). If the post information includes one or more URLs, the related content for the posts is computed based on URL freshness and mined from a source of the URL having associated behaviors (e.g. a search engine log).

With respect to freshness, if the URLs are fresh content (recent in time) such as news articles, then labels are generated for clusters of fresh content and the most commonly occurring label(s) are extracted as the dominant topics for these clusters. Next, any URL associated with the clusters above is associated with the extracted topics. The labels can then be used as the related content, or to associate the URLs with further related content.

With respect to mining, the related content can be mined from a source of URL with associated behaviors, such a search engine logs. The co-occurrence of clicks and URL can be used to derive the queries most related to a URL as the dominant topic for these URLs. Additionally, the labels generated above can be used as the related content, or to associate the URLs with further related content.

If the social media post does not include one or more URLs, then the related content for a post is based on the post information. The process begins by identifying all occurring concepts in a posting, using a list of significant labels (e.g., proper names, concept(s), or commonly occurring labels) derived from query logs or a corpus of text. Next, the dominant labels are determined using a relevance measure derived from the likelihood of a particular label being the most specific label in a text. The specificity of the labels is derived from the corpus of text and query logs described above. The dominant labels are then used as the related content or to associate the content with further related content.

After the related content is selected, one or more of the following may be displayed as the "annotation" previously described. As a first aspect, if two or more entities or concepts are returned, display the entities as the related content (see FIG. 5). As a second aspect, for a single or dominant topic, one or more of the following may be applied: show only the dominant intent as the related content (see FIG. 5); show a source of query suggestions (see FIG. 4); for entity type topics, show entities related to the entity, such as related entities (see FIG. 6); show the queries that most commonly lead to the URL (see FIG. 3); and/or, show other URLs which are often co-clicked with the displayed URL or queries associated with the content or URL (see FIG. 6). As a third aspect, associate the content with related images or videos (see FIG. 7).

Figure 3:
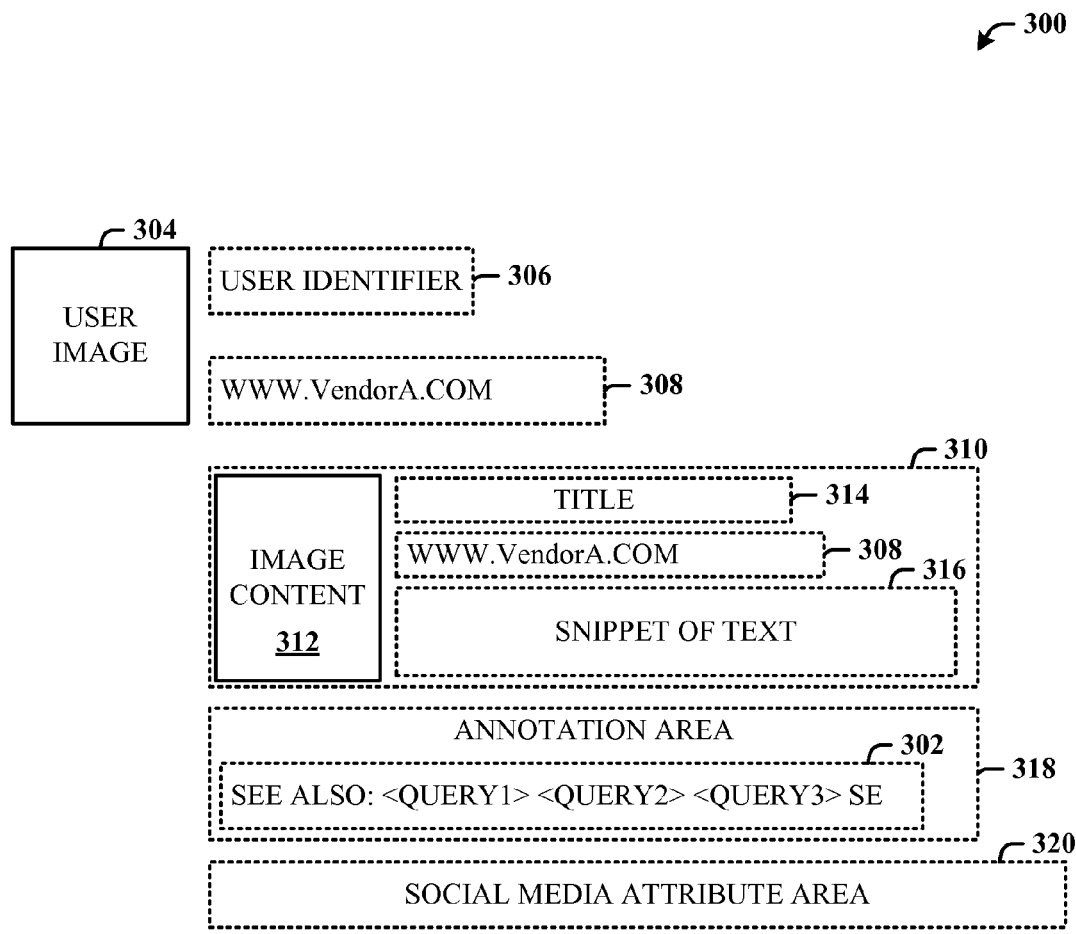
FIG. 3 illustrates a social media post and general (non-news) URL annotation as computed during content processing of the service of FIG. 2.

FIG. 3 illustrates a social media post 300 and general (non-news) URL annotation 302 as computed during content processing of the service 204 of FIG. 2. As depicted here, the social media post 300 can include a user image 304 selected by the social media user to be presented with/in the post 300. The post 300 can also include a user identifier 306 such as a user name, and a general URL (non-news) 308 (e.g., www.VendorA.com) as determined by the service 204. In this example, VendorA is in the business of promoting and facilitating travel. The general URL 308 can include words and/or characters in the domain address that provide some degree of intuitive identification of the associated vendor, vendor website, or webpage, although this is not needed since the identification can be ascertained by the architecture using other means (e.g., DNS (domain name system) lookup).

The post 300 can also include a caption area 310, which further includes image content 312 related to the general URL 308. For example, if the general URL 308 relates to travel, the image content 312 can be an image of a popular destination in a foreign country. The caption area 310 can also comprise a title 314 (e.g., "finding great cruise deals"), which can be a string of words or characters relating to the type of travel (e.g., a cruise), the general URL 308, and a snippet of text 316. The snippet of text 316 can be a brief description (e.g., "book travel for less with specials . . . ") that further describes the benefits/capabilities of the vendor associated with the general URL 308.

Below the caption area 310 is an annotation area 318 where the related content is presented as the annotation 302 to the post 300, although the location of the annotation area 318 in this embodiment is only one implementation, since the annotation 302 can be presented anywhere that may be intuitively clear to the viewer as being related to the social media post 300. As shown, the annotation 302 includes one or more active links presented as queries (Query1, Query2, and Query3) and a link to a search engine (SE). Continuing with the travel example, Query1 can be "airline tickets", Query2 can be "travel sites", and Query3 can be "vacation packages". Thus, selection of a query (e.g., Query1) will automatically cause the selected query to be executed in a search engine or other automated systems to return results. Alternatively, if the user prefers to go directly to the search engine, rather than select one of the presented queries, the user can select SE to bring up the search engine for entry of alternative search terms.

Below the annotation area 318 is a social media attribute area 320 that presents selectable (e.g., a hyperlink) and active (links to another document) attributes common to the specific social media feed. For example, the attributes can include, but are not limited to, Like, Comment, Share, Not Too Long Ago, and Only Me.

In operation, when the post 300 on a social media feed is received, the service 204 is called and processes the post 300 to determine the nature of the post content (e.g., content features such as user image 304, title 314, image content 312, general URL 308, snippet of text 316, etc.). After computing to determine if the post content includes a URL, it is further computed that the URL is a non-news URL (a general URL), and then fetches suggestions as part of the suggestions processing 218. The suggestions are then presented as queries in the annotation 302 of the social media post 300. The suggestions can be computed based on a reverse nearest-neighbor algorithm to choose the queries that lead to the general URL (or in some cases, domain) and show these queries as related searches.

Figure 4:
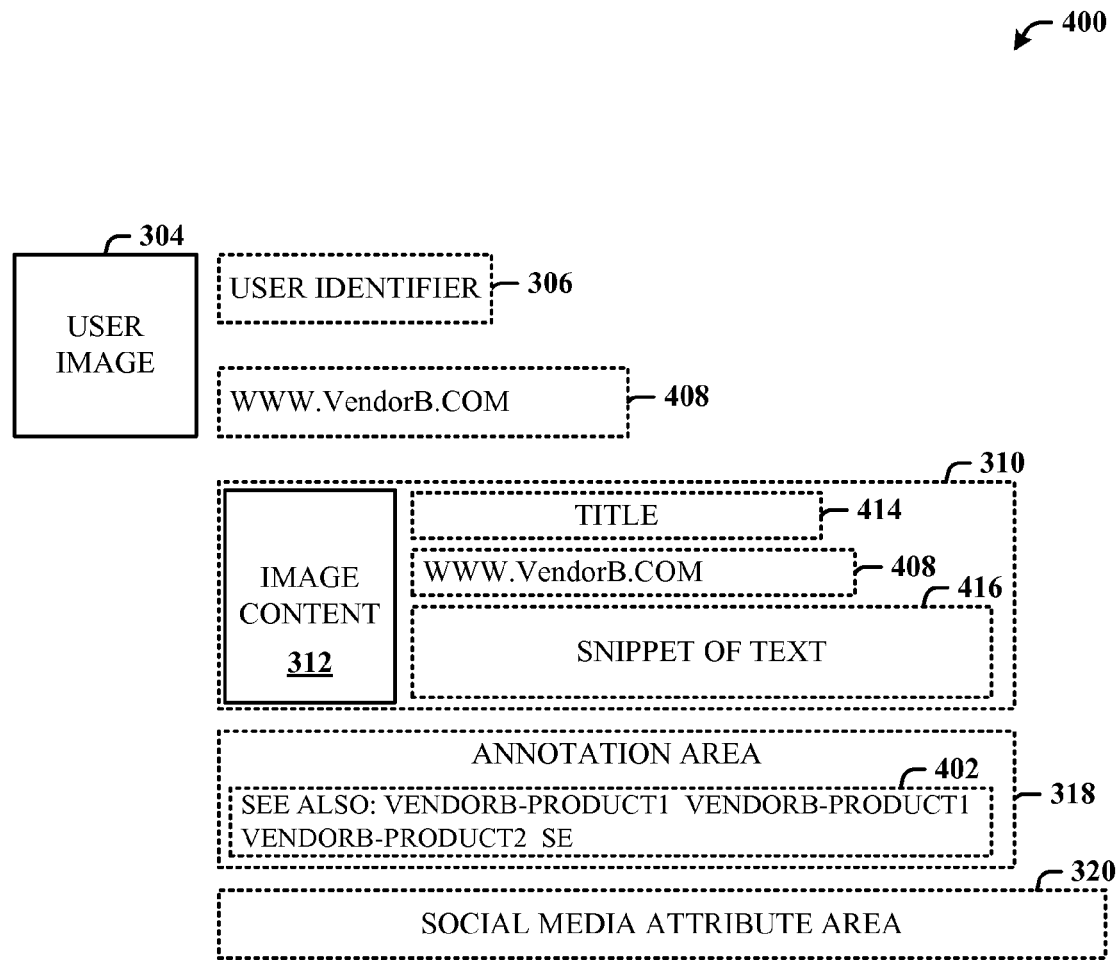
FIG. 4 illustrates a social media post and related canonical annotation as computed during content processing of the service of FIG. 2.

FIG. 4 illustrates a social media post 400 and related canonical annotation 402 as computed during content processing of the service 204 of FIG. 2. Here, the related content of the searches are for canonical (highly similar) queries for the general (non-news) URL. If a general URL 408 is associated with a given vendor, VendorB (e.g., www.VendorB.com) then the annotation 402 can include queries that further search for products of or for sale by the vendor. The title 414 can include domain information (e.g., VendorB.com) and associated text to purchase products from that vendor, for example. Additionally, the content of the snippet of text 416 can further include text to purchase products from VendorB. In other words, if the URL has a query that is clearly and exclusively linked to the URL, the related searches can be shown for that query as (See Also:) suggestions (in the annotation 402) for the URL 408. For example, Query1 can be VendorB-Product1 that links to a first web document of Product1, Query2 can be VendorB-Product1 that links to a second web document of Product1, Query3 can be VendorB-Product3 that links to a web document of Product3, and so on.

Figure 5:
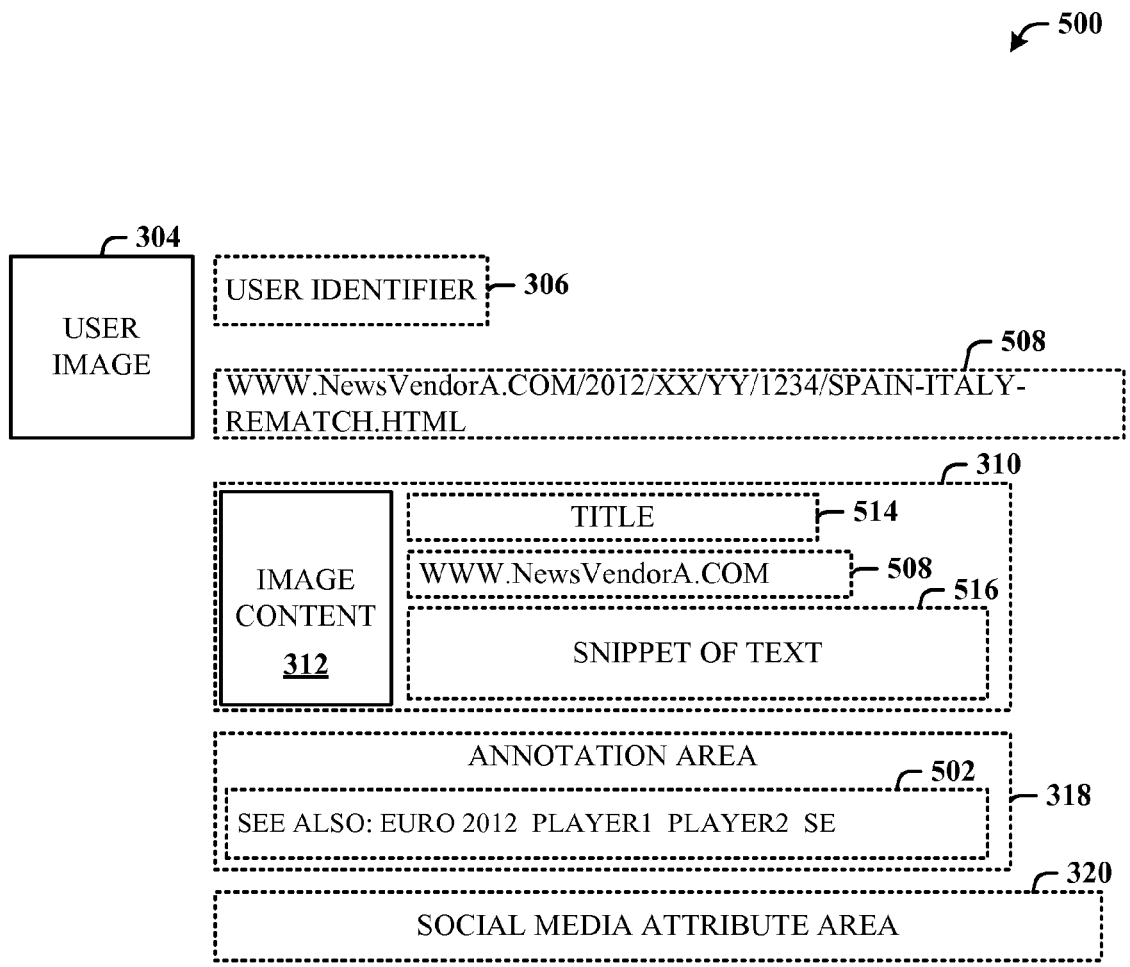
FIG. 5 illustrates a social media post and news URL annotation as computed during content processing of the service of FIG. 2.

FIG. 5 illustrates a social media post 500 and news URL annotation 502 as computed during content processing of the service 204 of FIG. 2. Here, the related content of the search is for a news URL 508. If the news URL 508 is associated with given news vendor, NewsVendorA (e.g., www.NewsVendorA.com) then the annotation 502 can include queries that further search for news items available from the news vendor.

The title 514 can include news domain information (e.g., NewsVendorA.com) and associated text to explore the news of a related news topic, for example. Additionally, the content of the snippet of text 516 can further include text such as commentary related to the news topic. In other words, this kind of annotation can be driven by the auto-terms of the news and possible cluster labels for the news stories. The related searches can be shown for that query as (See Also:) suggestions (in the annotation 502) for the news URL 508. For example, Query1 can be NewsTopic1 that links to a first web document of NewsTopic1, Query2 can be Player1 that links to a second web document of information associated with Player1, Query3 can be Player3 that links to a third web document of information associated with Player3, and so on.

Figure 6:
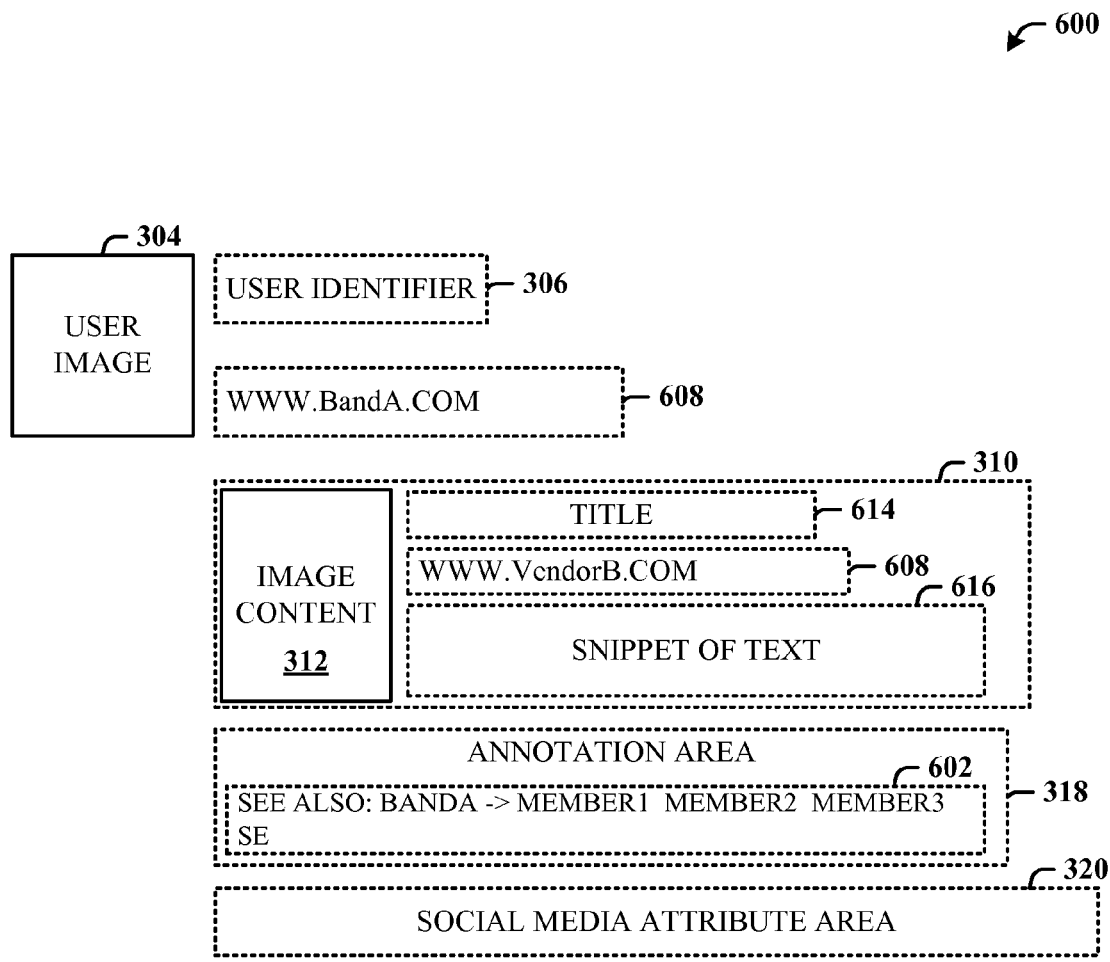
FIG. 6 illustrates a social media post and annotation that finds related entities for a canonical entity in a URL as computed during content processing of the service of FIG. 2.

FIG. 6 illustrates a social media post 600 and annotation 602 that finds related entities for a canonical entity in a URL as computed during content processing of the service 204 of FIG. 2. The related entities processing is utilized to further derive entities if there is a high confidence the URL is about a specific entity. For example, musical groups, movies, and TV show homepages can be useful in finding such related entities.

Here, the URL 608 can be www.BandAhq.com, the title 614 can include text that matches portions of the URL 608, the caption 310 includes the domain BandA.com, and the snippet of text 616 also includes related text. The related content (entities) of the searches can then be for members of the band. Thus, the related searches can be shown for that query as (See Also:) suggestions (in the annotation 602) for the band. For example, Query1 can be for Member1 that links to a first web document of information about Member1, Query2 can be for Member2 that links to a second web document of information about Member2, and Query3 can be for Member3 that links to a third web document of information about Member3, and so on.

Figure 7:
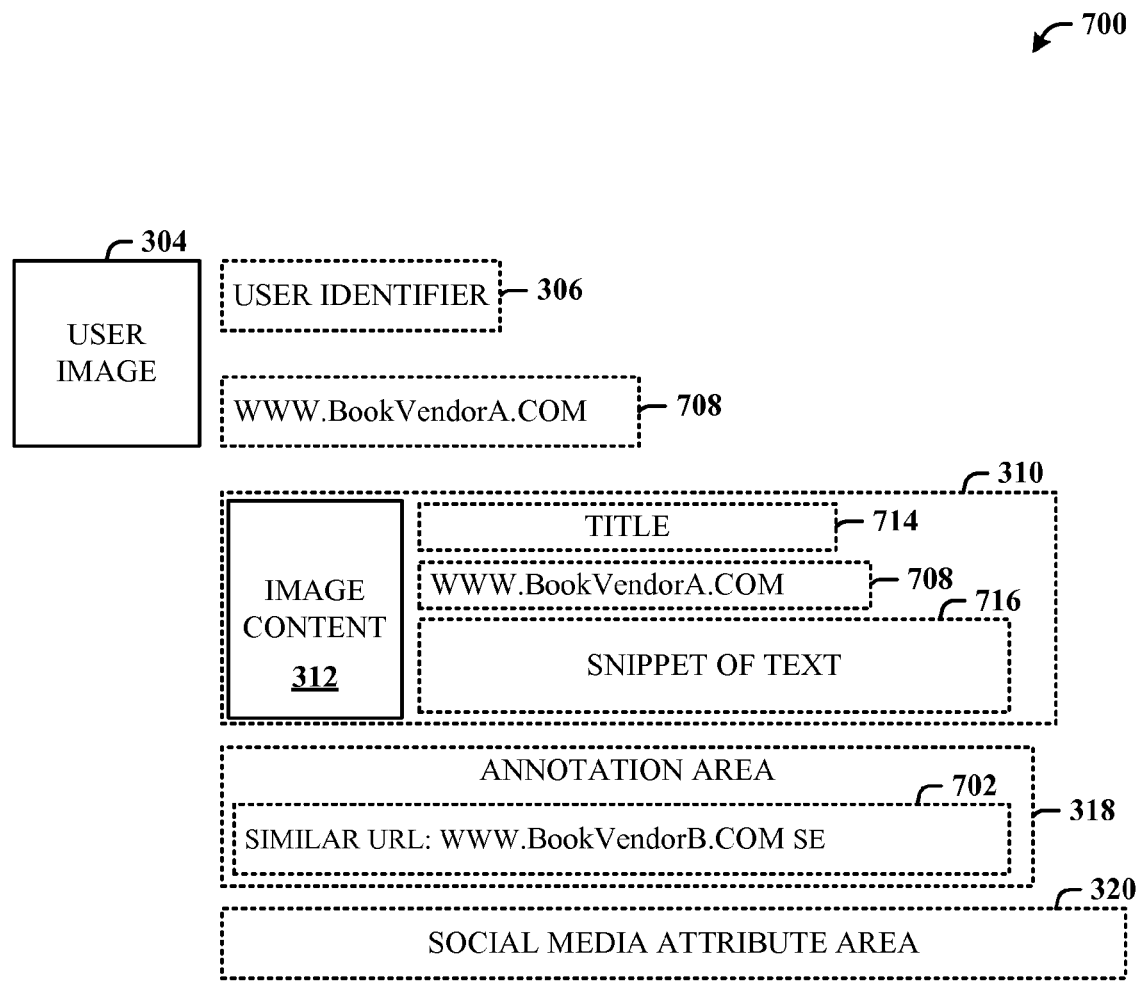
FIG. 7 illustrates a social media post and annotation that finds related URLs as computed during content processing of the service of FIG. 2.

FIG. 7 illustrates a social media post 700 and annotation 702 that finds related URLs as computed during content processing of the service 204 of FIG. 2. The related URLs processing is utilized to further derive URLs related to a given URL. Here, the URL 708 can be www.BookVendorA.com, the title 714 can include text that matches portions of the URL 708, the caption 310 includes the domain Book Vendor A URL, and the snippet of text 716 also includes text related to the business of Book Vendor A. The related URL of the annotation 702 can then be for a competitor book vendor, such as Book Vendor B. Thus, the related URL searches can be shown for that query as (Similar URL:) suggestions (in the annotation 702) as, for example, www-.BookVendorB.com, and so on.

Figure 8:
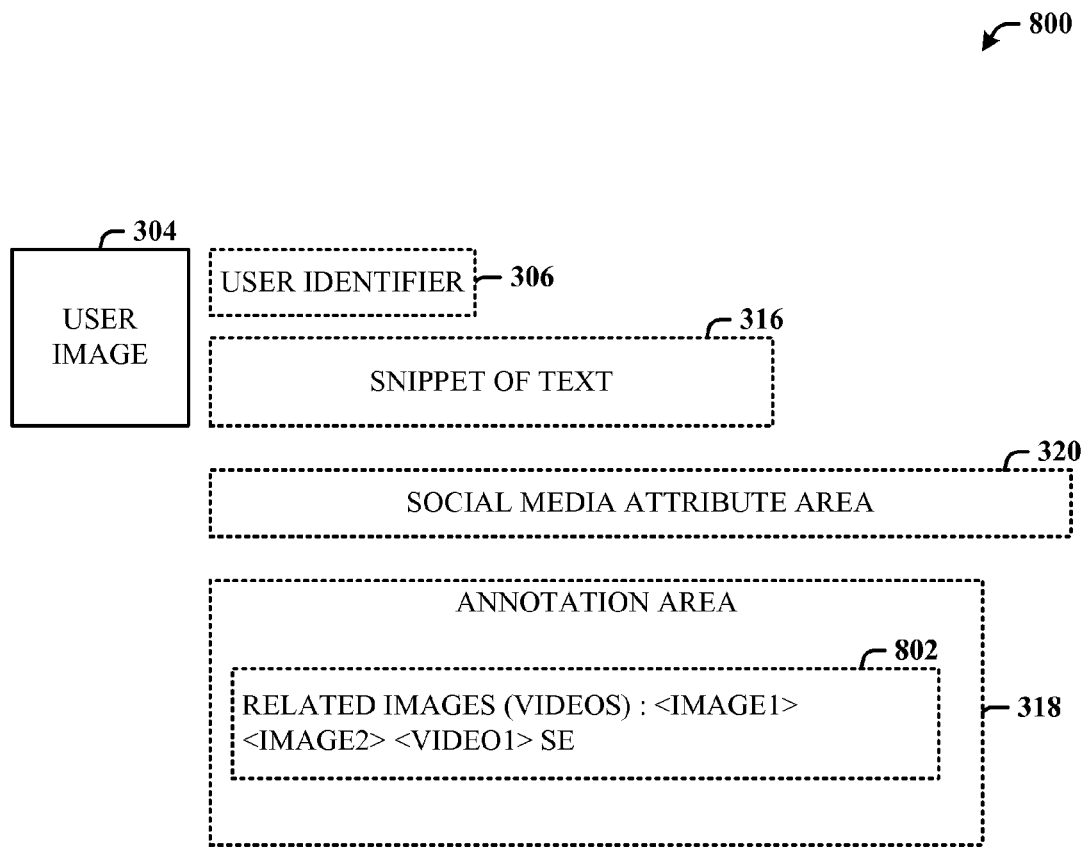
FIG. 8 illustrates a social media post and annotation that finds related images and/or videos as computed during content processing of the service of FIG. 2.

FIG. 8 illustrates a social media post 800 and annotation 802 that finds related images and/or videos as computed during content processing of the service 204 of FIG. 2. Here, the annotation area 318 can include the annotation "Related Images" for images, "Related Videos" for videos, or a combination "Related Images and Videos" for bother images and videos.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
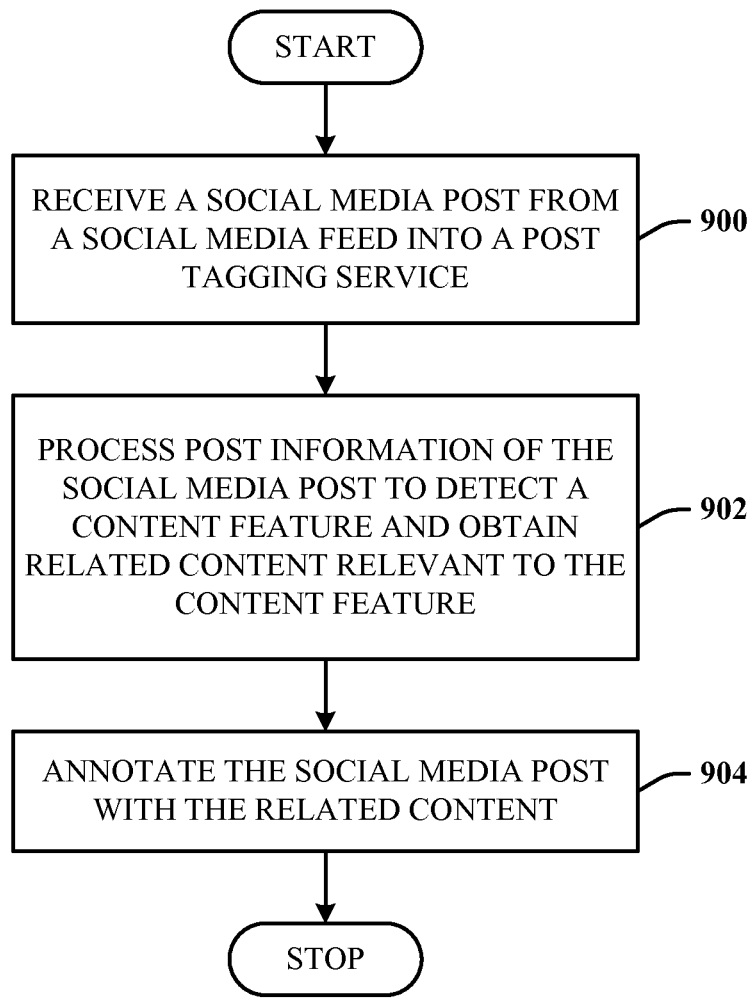
FIG. 9 illustrates a method in accordance with the disclosed architecture.

FIG. 9 illustrates a method in accordance with the disclosed architecture. At 900, a social media post from a social media feed into a post tagging service is received. At 902, post information of the social media post is processed to detect a content feature and obtain related content relevant to the content feature. At 904, the social media post is annotated with the related content.

The method can further comprise detecting the content feature as a uniform resource locator (URL) included in the post and annotating the social media post with content related to the URL. The method can further comprise detecting the content feature as at least one of text, image, or a video included in the post, and annotating the social media post with content related to at least one of the text, the image, or the video. The method can further comprise detecting the content feature as a uniform resource locator (URL) included in the post and annotating the social media post with related content linked-to by the URL. The method can further comprise performing suggestion processing to obtain a suggestion from one or more suggestion sources and sending the suggestion from the service to the social media feed for the annotating of the social media post.

The method can further comprise annotating the social media post with the related content, which related content is a search engine query, an image, a video, or a link to a related webpage. The method can further comprise processing the content feature to discriminate between a URL and media types of text, image, and videos. The method can further comprise processing the content feature to discriminate between a textual content URL and media types of text, image, and videos. The method can further comprise determining a re-query based on a dominant topic of a text social media post.

Figure 10:
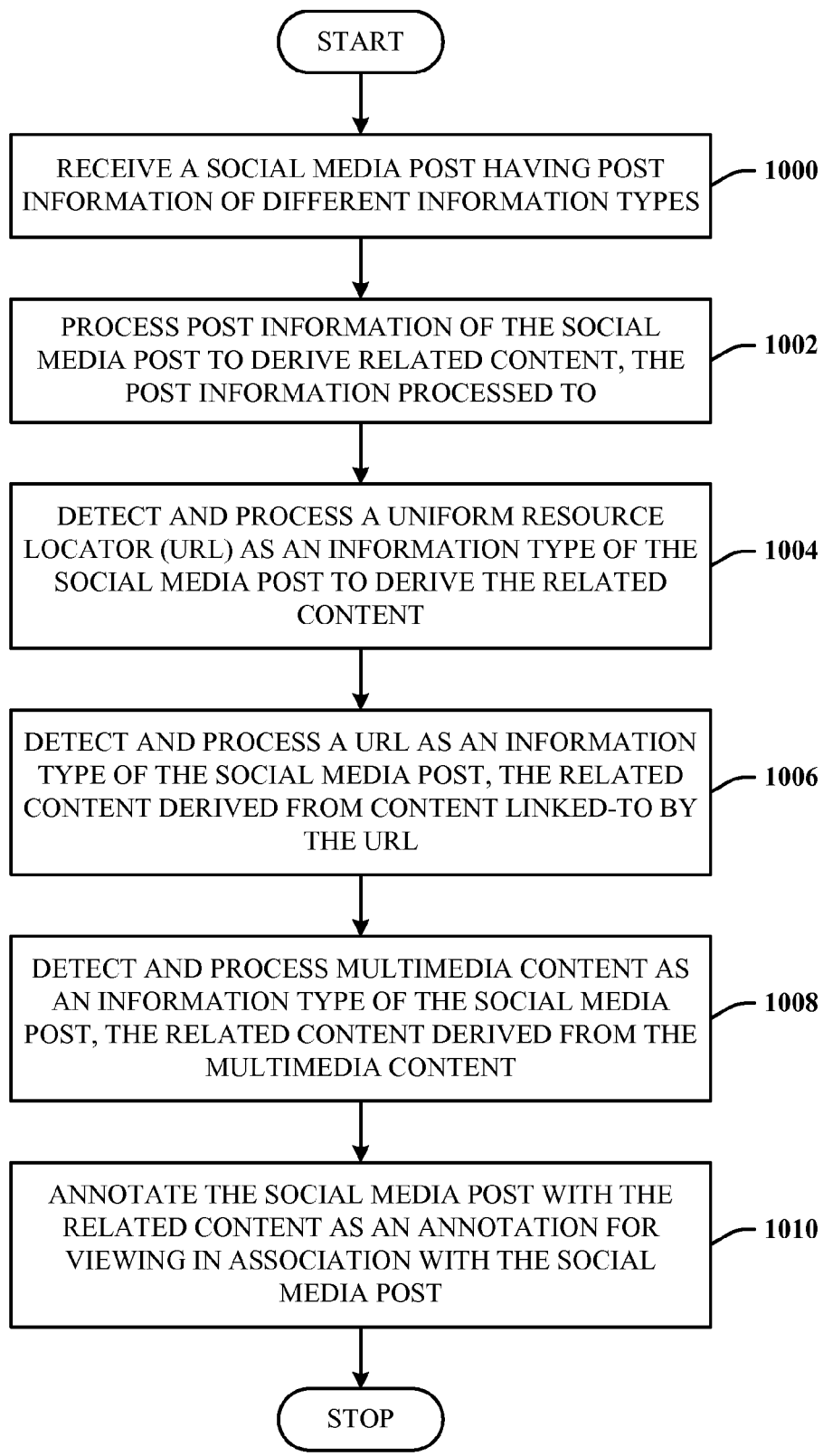
FIG. 10 illustrates an alternative method in accordance with the disclosed architecture.

FIG. 10 illustrates an alternative method in accordance with the disclosed architecture. At 1000, a social media post having post information of different information types is received (e.g., into a service from a social media feed). At 1002, post information of the social media post is processed to derive related content, the post information processed to, at 1004, detect and process a uniform resource locator (URL) as an information type of the social media post to derive the related content, at 1006, detect and process a URL as an information type of the social media post, the related content derived from content linked-to by the URL, and at 1008, detect and process multimedia content as an information type of the social media post, the related content derived from the multimedia content. At 1010, the social media post is annotated with the related content as an annotation for viewing in association with the social media post. The method can be facilitated by configuring a microprocessor to execute computer-executable instructions in a memory associated with at least one of the acts of receiving, processing, or annotating.

The method can further comprise processing the post information to detect and process a URL as an information type of the social media post to derive the related content, the URL is a news URL or a general URL. The method can further comprise processing the post information as part of a service that when called discriminates the information types as a URL, or multimedia associated with a social media post (e.g., longer text social media post or a short text social media post).

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 11:
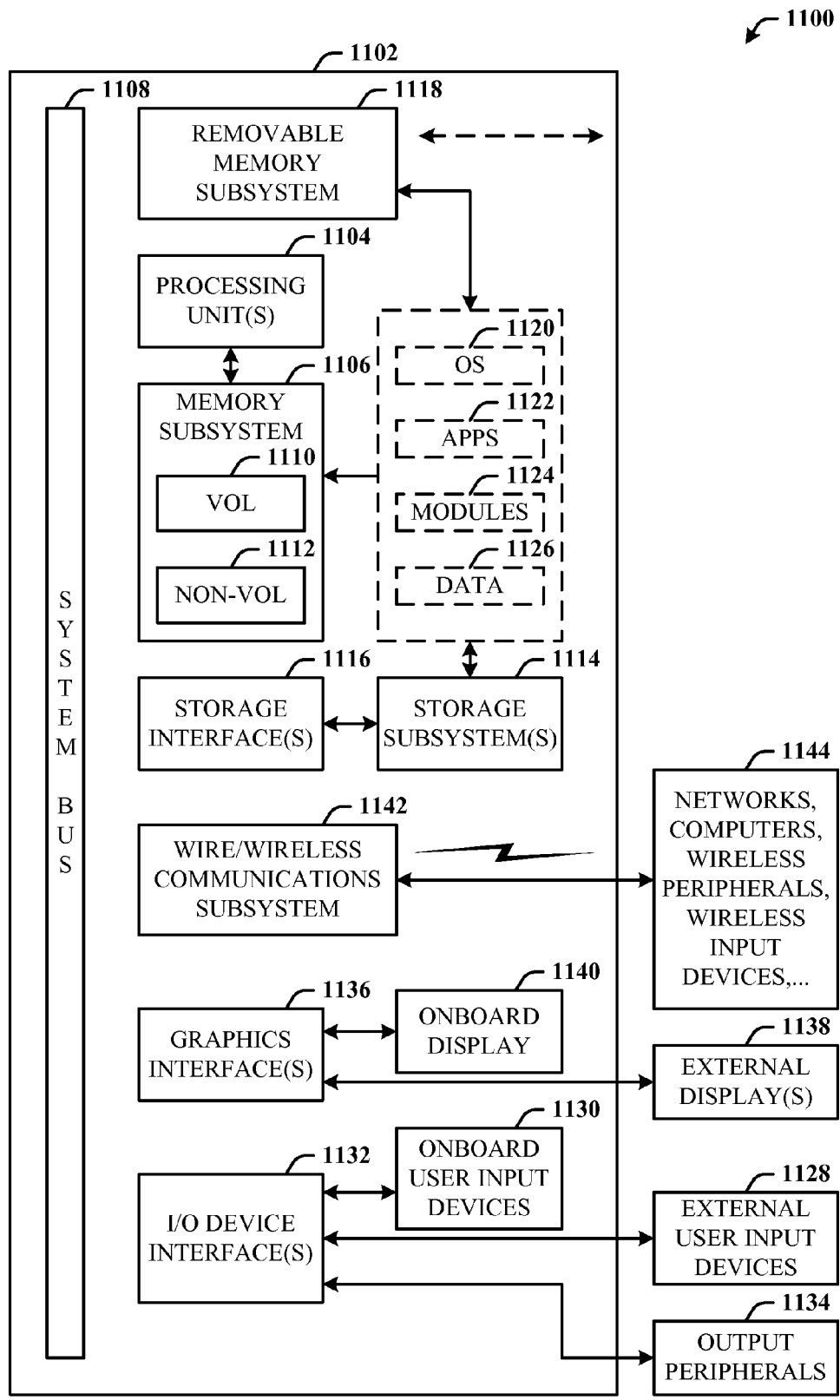
FIG. 11 illustrates a block diagram of a computing system that executes social media post annotation of related content in accordance with the disclosed architecture.

Referring now to FIG. 11, there is illustrated a block diagram of a computing system 1100 that executes social media post annotation of related content in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 11 and the following description are intended to provide a brief, general description of the suitable computing system 1100 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1100 for implementing various aspects includes the computer 1102 having processing unit(s) 1104 (also referred to as microprocessor(s) and processor(s)), a computer-readable storage medium such as a system memory 1106 (computer readable storage medium/ media also include magnetic disks, optical disks, solid state drives, external memory systems, and flash memory drives), and a system bus 1108. The processing unit(s) 1104 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 1102 can be one of several computers employed in a datacenter and/or computing resources (hardware and/or software) in support of cloud computing services for portable and/or mobile computing systems such as cellular telephones and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 1106 can include computer-readable storage (physical storage) medium such as a volatile (VOL) memory 1110 (e.g., random access memory (RAM)) and a non-volatile memory (NON-VOL) 1112 (e.g., ROM, EPROM, EEPROM, etc.). A basic input/output system (BIOS) can be stored in the non-volatile memory 1112, and includes the basic routines that facilitate the communication of data and signals between components within the computer 1102, such as during startup. The volatile memory 1110 can also include a high-speed RAM such as static RAM for caching data.

The system bus 1108 provides an interface for system components including, but not limited to, the system memory 1106 to the processing unit(s) 1104. The system bus 1108 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1102 further includes machine readable storage subsystem(s) 1114 and storage interface(s) 1116 for interfacing the storage subsystem(s) 1114 to the system bus 1108 and other desired computer components. The storage subsystem(s) 1114 (physical storage media) can include one or more of a hard disk drive (HDD), a magnetic floppy disk drive (FDD), solid state drive (SSD), and/or optical disk storage drive (e.g., a CD-ROM drive DVD drive), for example. The storage interface(s) 1116 can include interface technologies such as EIDE, ATA, SATA, and IEEE 1394, for example.

One or more programs and data can be stored in the memory subsystem 1106, a machine readable and removable memory subsystem 1118 (e.g., flash drive form factor technology), and/or the storage subsystem(s) 1114 (e.g., optical, magnetic, solid state), including an operating system 1120, one or more application programs 1122, other program modules 1124, and program data 1126.

The operating system 1120, one or more application programs 1122, other program modules 1124, and/or program data 1126 can include entities and components of the system 100 of FIG. 1, entities and components of the diagram 200 of FIG. 2, entities and components of the post 300 of FIG. 3, entities and components of the post 400 of FIG. 4, entities and components of the post 500 of FIG. 5, entities and components of the post 600 of FIG. 6, entities and components of the post 700 of FIG. 7, entities and components of the post 800 of FIG. 8, and the methods represented by the flowcharts of FIGS. 8 and 10, for example.

Generally, programs include routines, methods, data structures, other software components, etc., that perform particular tasks or implement particular abstract data types. All or portions of the operating system 1120, applications 1122, modules 1124, and/or data 1126 can also be cached in memory such as the volatile memory 1110, for example. It is to be appreciated that the disclosed architecture can be implemented with various commercially available operating systems or combinations of operating systems (e.g., as virtual machines).

The storage subsystem(s) 1114 and memory subsystems (1106 and 1118) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) can be any available media (medium) that do (does) not employ propagated signals, can be accessed by the computer 1102, and includes volatile and non-volatile internal and/or external media that is removable and/or non-removable. For the computer 1102, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 1102, programs, and data using external user input devices 1128 such as a keyboard and a mouse, as well as by voice commands facilitated by speech recognition. Other external user input devices 1128 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1102, programs, and data using onboard user input devices 1130 such a touchpad, microphone, keyboard, etc., where the computer 1102 is a portable computer, for example.

These and other input devices are connected to the processing unit(s) 1104 through input/output (I/O) device interface(s) 1132 via the system bus 1108, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1132 also facilitate the use of output peripherals 1134 such as printers, audio devices, camera devices, and so on, such as a sound card and/or onboard audio processing capability.

One or more graphics interface(s) 1136 (also commonly referred to as a graphics processing unit (GPU)) provide graphics and video signals between the computer 1102 and external display(s) 1138 (e.g., LCD, plasma) and/or onboard displays 1140 (e.g., for portable computer). The graphics interface(s) 1136 can also be manufactured as part of the computer system board.

The computer 1102 can operate in a networked environment (e.g., IP-based) using logical connections via a wired/wireless communications subsystem 1142 to one or more networks and/or other computers. The other computers can include workstations, servers, routers, personal computers, microprocessor-based entertainment appliances, peer devices or other common network nodes, and typically include many or all of the elements described relative to the computer 1102. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1102 connects to the network via a wired/wireless communication subsystem 1142 (e.g., a network interface adapter, onboard transceiver subsystem, etc.) to communicate with wired/wireless networks, wired/wireless printers, wired/wireless input devices 1144, and so on. The computer 1102 can include a modem or other means for establishing communications over the network. In a networked environment, programs and data relative to the computer 1102 can be stored in the remote memory/storage device, as is associated with a distributed system. It will be appreciated that the network connections shown are exemplary and other means of establishing a communications link between the computers can be used.

The computer 1102 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising a hardware processor and a memory device, the memory device configured to store execute computer-executable instructions that when executed by the hardware processor cause the processor to implement one or more components of the system, the one or more components comprising:

a processing component configured to receive a social media post and process the social media post to identify different information types that include at least one of text, an image, a video, or a uniform resource locator (URL), the processing component configured to process the social media post to determine a topic for each type of the information types, and to derive related content associated with the topic of each of the information types, the URL in the social media post identified as an information type and annotations for the URL chosen as at least one of, related queries that lead to the URL, related queries as canonical queries for the URL, or related entities for a canonical entity in the URL; and an annotation component configured to annotate the social media post with at least one of a related query or a related entity associated with the related content as one or more annotations for viewing in association with the social media post, wherein selection of the one or more annotations query causes execution by a search engine to return search results.

2. The system of claim 1, wherein the processing component is configured to detect and process the URL as an information type of the social media post to derive the related query.

3. The system of claim 1, wherein the processing component is configured to detect and process the URL as an information type of the social media post, the related query derived from content linked-to by the URL.

4. The system of claim 1, wherein the processing component is configured to detect and process multimedia content as an information type of the social media post, the related query derived from the multimedia content.

5. The system of claim 1, wherein the processing component is part of a service that when called discriminates the information types as a URL, or multimedia associated with a text social media post.

6. The system of claim 1, wherein the annotation component is configured to annotate the social media post with related content that is an image or a video.

7. The system of claim 1, wherein the processing component is configured to detect and process the URL as an information type of the social media post to derive the related query, the URL is a news URL or a general URL.

8. The system of claim 1, wherein the processing component is configured to process the social media post as a text post and extract a dominant entity from the text post for suggestions processing to return suggested related content for annotation of the social media post.

9. A computer-implemented method comprising computer executable instructions that when executed by a hardware processor cause the hardware processor to perform acts of:
receiving a social media post from a social media feed into a post tagging service;
processing post information of the social media post to detect a type of content feature of the post information and obtain suggestions for related queries having a topic relevant to the content feature, the content features detected as at least one of a uniform resource locator (URL), text, image, or a video;
identifying a URL in the social media post and choosing as suggestions at least one of, related queries that lead to the URL, related queries as canonical queries for the URL, or related entities for a canonical entity in the URL; and
annotating the social media post with the related queries as suggestions for viewing in the social media feed, a selected suggestion executable by a search engine to return a search result.

10. The method of claim 9, further comprising detecting the URL as a content feature included in the post and annotating the social media post with content related to the URL.

11. The method of claim 9, further comprising annotating the social media post with content related to at least one of the text, the image, or the video.

12. The method of claim 9, further comprising detecting the URL as a content feature included in the post and annotating the social media post with related content linked-to by the URL.

13. The method of claim 9, further comprising performing suggestion processing to obtain a suggestion from one or more suggestion sources and sending the suggestion from the service to the social media feed for the annotating of the social media post.

14. The method of claim 9, further comprising annotating the social media post with the related queries, which related queries include a search engine query in combination with an image, a video, or a link to a related webpage.

15. The method of claim 9, further comprising processing the content feature to discriminate between a URL and media types of text, image, and videos.

16. The method of claim 9, further comprising processing the content feature to discriminate between a general URL and a news URL.

17. The method of claim 9, further comprising determining a re-query based on a dominant topic of a text social media post.

18. A computer-readable hardware storage medium comprising computer-readable instructions that when executed by a hardware processor, cause the hardware processor to perform acts of:
receiving a social media post from a social media feed into a post tagging service;
processing post information of the social media post to detect types of content features in the post information and obtain suggestions for related queries having a topic relevant to the content features, the content features detected as at least one of a uniform resource locator (URL), text, image, or a video;
identifying a URL in the social media post and choosing as suggestions at least one of, related queries that lead to the URL, related queries as canonical queries for the URL, or related entities for a canonical entity in the URL; and
annotating the social media post with the related queries as suggestions for viewing in the social media feed, a selected suggestion executable by a search engine to return a search result.

19. The computer-readable hardware storage medium of claim 18, further comprising, where more than one entity is computed as related entities, displaying as suggestions to the social media post, the related entities.

20. The computer-readable hardware storage medium of claim 18, further comprising, where a single dominant intent is computed, displaying at least one of only the dominant intent as a related query, other URLs that are frequently co-clicked with the URL in the social media post, or queries that commonly lead to the URL in the social media post.

* * * * *